United States Patent [19]
Alten

[11] Patent Number: 5,195,285
[45] Date of Patent: Mar. 23, 1993

[54] DEFORMABLE SEALING DEVICE FOR A GAP BETWEEN A WALL OPENING OF A BUILDING WALL AND A BACK WALL OF A VEHICLE

[76] Inventor: Kurt Alten, Ringstr. 14, D-3015 Wennigsen, Fed. Rep. of Germany

[21] Appl. No.: 766,560

[22] Filed: Sep. 25, 1990

[30] Foreign Application Priority Data

Aug. 9, 1990 [DE] Fed. Rep. of Germany ....... 4111367
Sep. 25, 1990 [DE] Fed. Rep. of Germany ....... 4030253

[51] Int. Cl.⁵ ............................................. E04H 14/00
[52] U.S. Cl. ................................................. 52/173 DS
[58] Field of Search ................... 52/173 DS; 248/242; 211/90

[56] References Cited

U.S. PATENT DOCUMENTS

| | | | |
|---|---|---|---|
| 3,375,625 | 4/1968 | Edkins et al. | |
| 3,826,049 | 7/1974 | Frommelt | 52/173 DS |
| 4,359,846 | 11/1982 | Votteler | 52/173 DS |
| 4,554,768 | 11/1985 | Srajer | 52/173 DS |
| 4,825,606 | 5/1989 | Alden | 52/173 DS |
| 4,873,801 | 10/1989 | Winters | 52/173 DS |

FOREIGN PATENT DOCUMENTS

| | | | |
|---|---|---|---|
| 1034433 | 7/1978 | Canada | 52/173 DS |
| 2428989 | 6/1974 | Fed. Rep. of Germany . | |
| 7425832 | 7/1974 | Fed. Rep. of Germany . | |
| 8030004 | 11/1980 | Fed. Rep. of Germany . | |
| 8717557 | 9/1987 | Fed. Rep. of Germany . | |
| 1359641 | 7/1974 | United Kingdom . | |

Primary Examiner—David A. Scherbel
Assistant Examiner—Beth A. Aubrey
Attorney, Agent, or Firm—Robert W. Becker & Associates

[57] ABSTRACT

A deformable sealing device for a gap between a wall opening of a building wall and a back wall of a vehicle docking at the wall opening is provided. The sealing device comprises a flappy deformable skirt that has an upper transverse portion, that is connected at an upper edge thereof to a transverse support, and two deformable vertical strips that are arranged parallel to vertical sides of the wall opening and are supported at respective support bodies. The support bodies are elastically deformable in a direction towards the building wall. A top cover extending from the upper transverse portion to the building wall is provided. The transverse support together with the upper transverse portion and the top cover are supported in a liftable and lowerable manner.

23 Claims, 3 Drawing Sheets

DEFORMABLE SEALING DEVICE FOR A GAP BETWEEN A WALL OPENING OF A BUILDING WALL AND A BACK WALL OF A VEHICLE

BACKGROUND OF THE INVENTION

The present invention relates to a deformable sealing device for a gap between a wall opening of a building wall and a back wall of a vehicle docking at the wall opening whereby the sealing device comprises a flappy deformable skirt comprising an upper transverse portion that is connected at an upper edge thereof to a transverse support and two deformable vertical strips that are arranged parallel to vertical sides of the wall opening and are supported at respective support bodies that are elastically deformable in a direction towards the building wall. A top cover extending from the upper transverse portion to the building wall is also provided.

Deformable sealing devices of the aforementioned kind have been proven successful in the past but difficulties arise when semi-trucks are parked in front of the sealing device and the container must be raised in order to remove the tractor from the container. To achieve this the container must be lifted by up to approximately 40 cm and the top of the container will then press against the upper transverse portion of the sealing device. Furthermore the aforementioned sealing devices are unsuitable for very tall vehicles.

It is therefore an object of the present invention to improve the aforementioned sealing devices such that they are suitable for the aforementioned applications.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
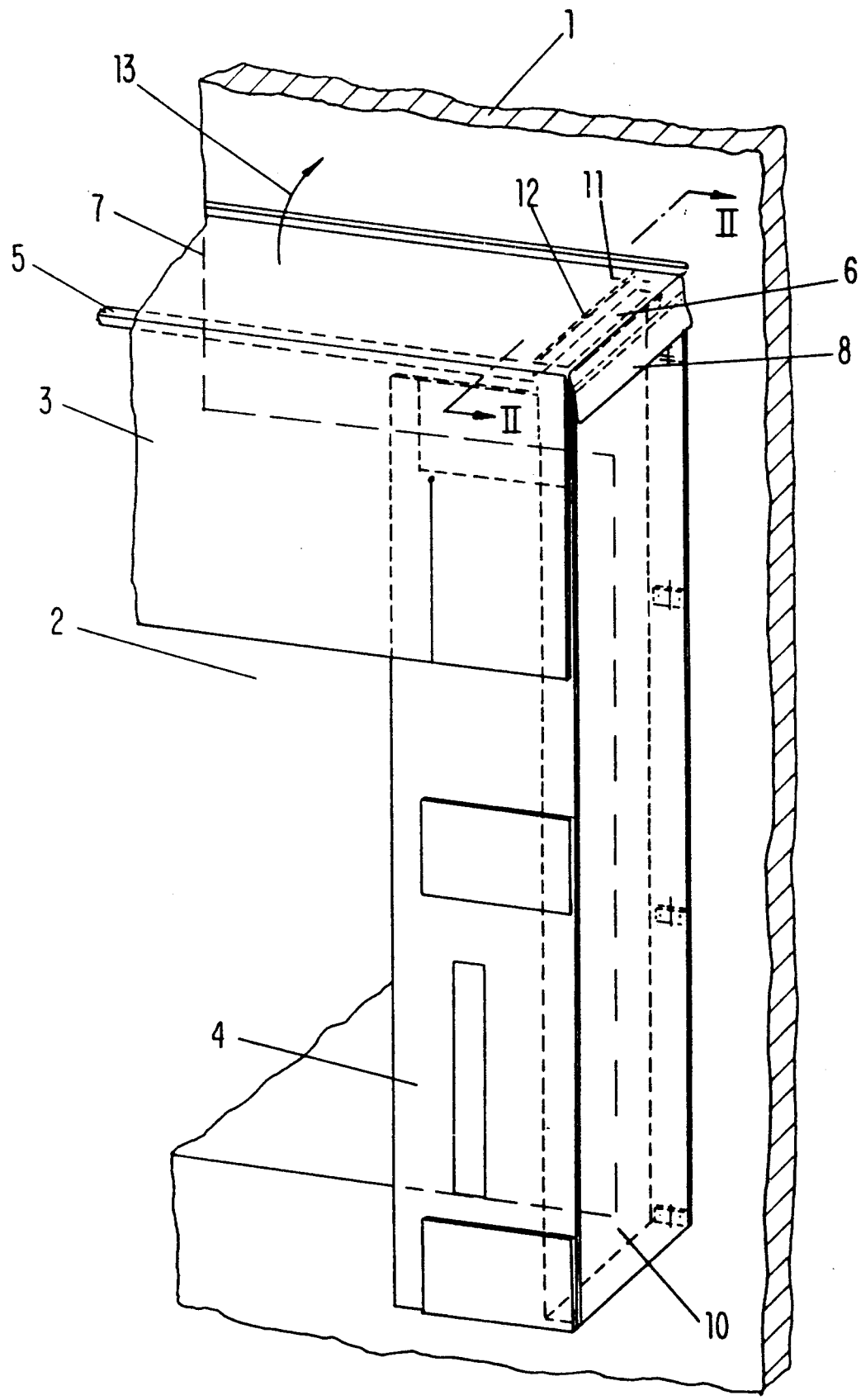
FIG. 1 shows the right half of a scaling device according to the present invention in a perspective representation.
Figure 2:
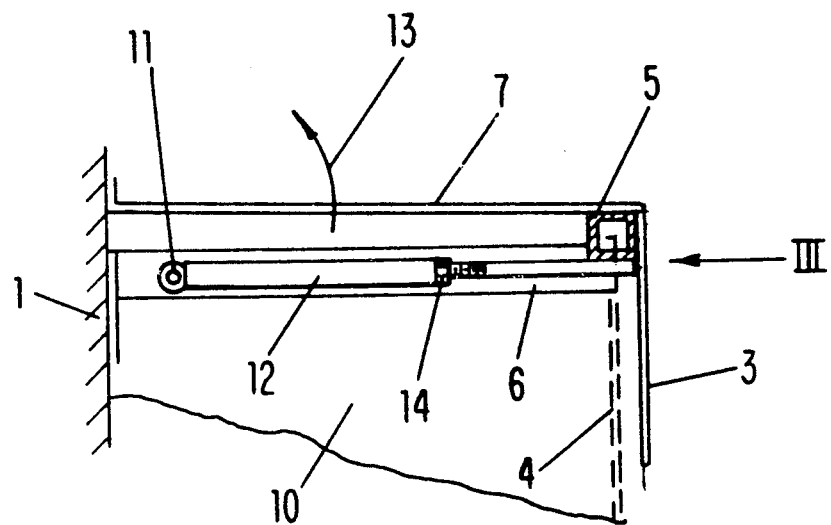
FIG. 2 is a partial cross-sectional view along the line II—II of FIG. 1.
Figure 3:
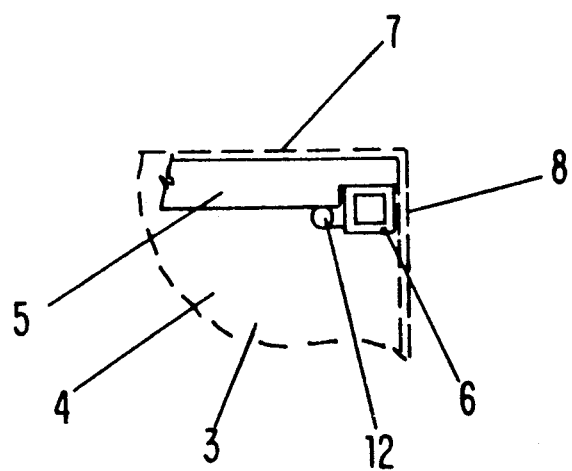
FIG. 3 shows a detail of FIG. 2 viewed in the direction of arrow III.

The deformable sealing device of the present invention is primarily characterized by the transverse support together with the upper transverse portion and the top cover being supported in a liftable and lowerable manner.

It is expedient that these lifting and lowering adjustments are not carried out by actual lifting movements but by a pivoting action. The aforementioned transverse support is thus connected to guide rods that extend in a backward direction such that by pivoting the guide rods the transverse support is moved in an upward direction and may be pivoted back into the initial position after the situation that required the lifting has passed. The transverse support and the guide rods may be secured in the initial position by respective abutments on which the guide rods respectively the transverse support may rest during normal operational conditions.

It is usually unnecessary to have special drive means such as hydraulic pivoting cylinders in order to lift the transverse support. It is instead expedient to effect the raising respectively pivoting action via the pressure that is exerted onto the deformable sealing device by the docking vehicle. The support with the aforementioned additional elements thus escapes the pressure exerted by the vehicle. This effect may also take place when the horizontal pressure onto the transverse portion is too great so that the transverse portion bulges in a slanted backwardly oriented direction whereby a lifting force may result due to the resulting vertical force component.

Accordingly, with the present invention the transverse support together with the upper transverse portion and the cover are liftable against the force of the dead weight of the transverse support, the upper transverse portion and the top cover. The transverse support together with the other aforementioned elements may also be liftable against an additional elastic force, for example, exerted by a pressure spring.

Preferably, the transverse support is pivotable about a horizontal axis by pivotable guide rods whereby the horizontal axis is located adjacent to the building wall. It is expedient that the length of the guide rods is adjustable. The guide rods may rest loosely on abutments, for example, in the form of arms. Preferably, the guide rods are supported at those arms and extend parallel to them. The length of the guide rods may further be reducible against an elastic force that is, for example, generated by a pressure spring.

In another embodiment, that the guide rods are in the form of a telescopic arrangement with the pressure spring arranged inside the guide rods. Furthermore, the guide rods are provided with securing means for preventing a pivoting of the guide rods in a downward direction from their initial position during normal operational conditions and the guide rods are provided as the exclusive support means for supporting the transverse support, the upper transverse portion and the top cover. The guide rods are usually connected to the free ends of the transverse support. It is expedient that two of the guide rods are provided laterally outwardly at both vertical sides of the sealing device. The transverse support maY rest loosely on abutments which may be in the form of arms, so that the transverse support with free ends thereof rests on the arms that are supported at the building wall. The transverse support may be provided with recesses at the free ends with which the free ends then rest on the arms.

In another embodiment the transverse support together with the upper transverse portion and the top cover are supported in an initial position by guide rods extending in an upward direction at an acute angle relative to the building wall, whereby the guide rods have an adjustable length. Preferably, the guide rods are pivotably fastened to the building wall at a location at a distance below the top cover. The guide rods are pivotably fastened with an upper end thereof to the transverse support. Furthermore, guide rods may be fastened to the building wall via intermediate pieces that are fixedly connected to the building wall.

It is expedient that the guide rods comprise essentially a rod and a pipe, whereby the rod is inserted into the pipe and is provided with an abutment at a free end thereof which abutment may be adjustable and removable. The guide rods are connected to the free ends of the transverse support. It is expedient, that the guide rods are positioned laterally outwardly at either side of the sealing device.

DESCRIPTION OF PREFERRED EMBODIMENTS

The present invention will now be described in detail with the aid of several specific embodiments utilizing FIGS. 1 through 5.

The building wall 1 is provided with a wall opening 2 which may be closed by a gate, for example, a sectional gate. In order to seal the gap between the wall opening 2 respectively the edge of such an opening against the back wall of a docked vehicle the deformable sealing device according to the drawings is suggested.

A deformable skirt is provided at a distance from the building wall 1. The skirt comprises an upper transverse portion 3 and two vertical strips 4 arranged in parallel to the vertical sides of the wall opening 2. The components 3, 4 are comprised of a flappy foil-like material which allows a deformation and adaptation to the contour of the vehicle. Commonly, these components are made of a fabric that is treated or coated with plastic or rubber.

The upper transverse portion 3 is connected to a transverse support 5 with its upper edge and is suspended in the manner of a curtain. A top cover or tarpaulin 7 extends from the transverse support towards the building wall 1. The top cover 7 is connected to the building wall 1. The transverse support 5 is provided with downwardly oriented recesses at its free ends which are engaged by arms 6 that are connected to the building wall 1. The arms 6 thur support the transverse support 5, the upper transverse portion 3 and the top cover 7. The lateral ends of the top cover 7 are provided with free hanging overhangs 8.

The two vertical strips 4 are supported by elastically deformable support bodies 10 that are attached to the building wall 1. The support bodies 10 are deformable in a direction towards the building wall.

At the sides of the arms 6 that are facing one another respective horizontal bolts 11 are provided which serve as a pivoting axis for the pivoting support of the guide rods 12 which extend parallel to the arms 6 and are fixedly connected at their front end to the transverse support 5. Since the ends of transverse support 5 rest only loosely on the arms 6 due to their dead weight and due to the weight of the corresponding components 3, 7, 8, the transverse support 5 together with the transverse portion 3 and the top cover 7 as well as the two lateral overhangs 8 may be pivoted in an upward direction that corresponds to the arrow 13.

In order to be able to adjust the length of the guide rods 12 the guide rods are provided in a two-part design whereby one part may be screwed into the other and a fixation of the chosen position may be secured by a lock nut 14.

Since the support of the vertical strips 4 at the support body 10 is independent of the support of the upper transverse portion 3, the aforementioned pivoting action only moves the transverse support 5 together with the connected components 3, 7, 8. The vertical strips 4 and the support body 10 are not influenced by this movement and remain in their position.

A pivoting as described above takes place for example, when a semi-truck with container has docked at the wall opening and the container, in order to retract the tractor, must be lifted and placed on the ground. In such a situation the pivoting action will be used. The pivoting action may also be useful when a very tall vehicle must be docked and the upper transverse portion 3 is compressed and bulges in a slanted backwardly directed manner. This will result in an upward force which effects the lifting of the transverse support 5 together with the connected components 3, 7, 8. In this manner damage to the deformable sealing device is prevented.

The adjustability of the length of the arms 6 has furthermore the advantage that the tension of the top cover 7 may be adjusted.

Due to the present invention, the transverse support 5 may be maintained in its initial position by a spring or a similar means whereby the elastic force must be overcome during the lifting, respectively pivoting action.

Figure 4:
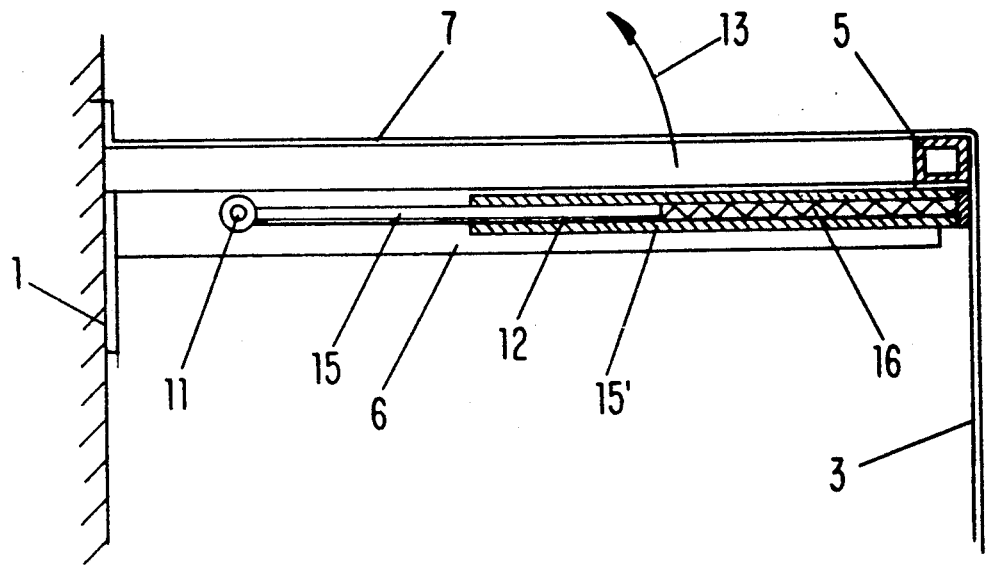
FIG. 4 shows a different embodiment in a view corresponding to the one of FIG. 2.

In the embodiment according to FIG. 4 the guide rod 12 is provided in a telescopic design. The rod 15 which is supported at the bolt 11 is slidable arranged within the pipe 15' such that the length of the guide rod 12 is reducible against the force of a pressure spring 16 which is located within the pipe 15'. The pipe 15' is fixedly connected to the transverse support 5. When pressure is exerted onto the transverse portion 3 in the direction of the building wall 1 the rod 15 is pushed into the pipe 15' so that in this manner the transverse support 5 is also provided with a deformation movement in the direction of the building wall 1. In this embodiment the transverse support 5 is slidably resting on the arms 6 and the guide rods 12 may thus carry out a pivoting movement in an upward direction corresponding to the arrow 13. Optionally the guide rod 12 may be the exclusive support of the transverse support 5. Then, an abutment must be provided which prevents the downward pivoting movement of the guide rods 12, so that arms 6 are not required in this case.

Figure 5:
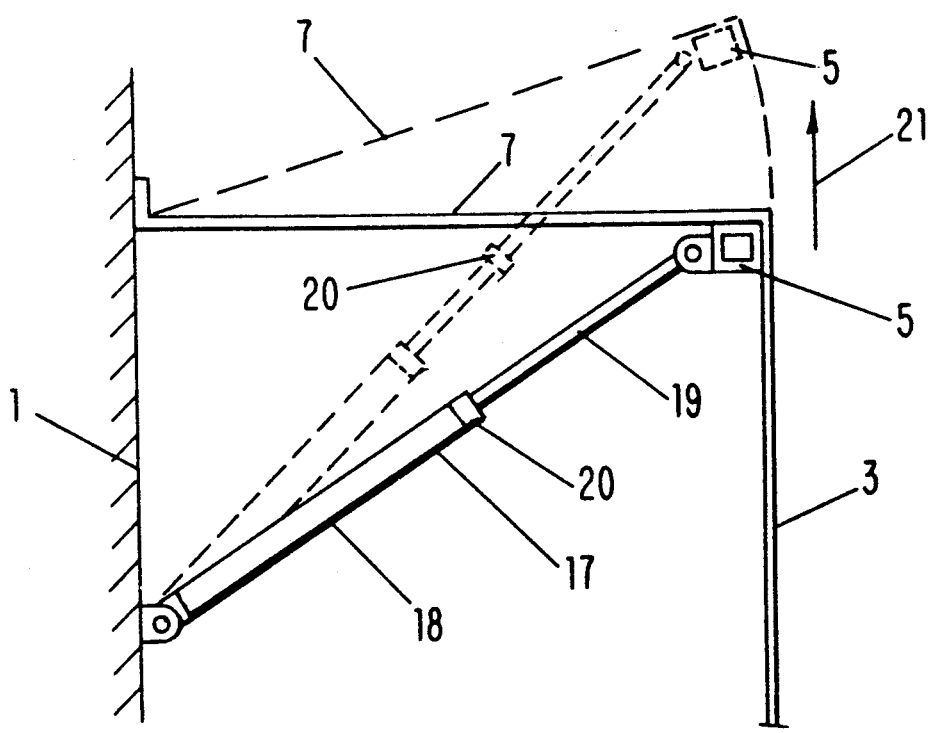
FIG. 5 shows a further embodiment in a view according to FIG. 2.

In the embodiment according to FIG. 5 the transverse support 5 together with the components 3, 7 and 8 is supported by guide rods 17 at its free ends. The guide rods 17 are connected to the building wall 1 at a distance below the transverse support 5 so that they form an acute angle relative to the building wall 1 and extend in an upward direction towards the transverse support 5. The guide rods 17 are pivotably connected to the building wall as well as to the transverse support. The guide rods 17 are embodied in a telescopic arrangement comprising a pipe 18 that is positioned at the lower end and receives the rod 19 that is provided with an abutment 20. The abutment 20, in the initial position of the transverse support 5, rests at the upper face of the pipe 18. When forces are exerted in an upward direction onto the transverse support 5, respectively the upper transverse portion 3, in the direction of the arrow 21 the guide rod 17 will pivot in an upward direction, for example, into the position that is indicated by dash-dotted lines in FIG. 5. The abutment 20 is accordingly moved away from the pipe 18. When the forces cease the transverse support 5 together with the connected components 3 and 7 is moved back into its initial position under its own weight whereby the initial position is determined by the abutment 20 which comes to rest against the face of the pipe 18. In this manner, a lifting movement of the transverse support 5 is achieved without providing special fixtures or the aforementioned arms 6. The guide rods 17 serve simultaneously to support the transverse support 5 with its connected components 3 and 7 and to allow the pivoting movement.

The present invention is, of course, in no way restricted to the specific disclosure of the specification and drawings, but also encompasses any modifications within the scope of the appended claims.

I claim:

1. A deformable sealing device for a gap between a wall opening of a building wall and a back wall of a vehicle docking at the wall opening, said sealing device comprising a flappy deformable skirt, support bodies, and a transverse support, said deformable skirt comprising an upper transverse portion with an upper edge, said upper edge connected to said transverse support, said deformable skirt further comprising two deformable vertical strips that are arranged parallel to vertical sides of the wall opening and are supported at respective ones of said support bodies, that are elastically deformable in a direction towards the building wall, said sealing device further having a top cover extending from said upper transverse portion to the building wall, wherein the improvement comprises:

said transverse support together with said upper transverse portion and said top cover being supported so as to be liftable from and returnable to an initial position, with said transverse support pivotable about a horizontal axis by pivotable guide rods, said horizontal axis being located adjacent to the building wall, and with a length of said guide rods being adjustable.

2. A deformable sealing device according to claim 1, wherein said transverse support together with said upper transverse portion and said top cover are liftable against a force of a dead weight of said transverse support, said upper transverse portion and said top cover.

3. A deformable sealing device according to claim 2, wherein said transverse support together with said upper transverse portion and said top cover are liftable against an additional elastic force.

4. A deformable sealing device according to claim 1, wherein said guide rods rest loosely on abutments.

5. A deformable sealing device according to claim 4, wherein said abutments are arms.

6. A deformable sealing device according to claim 4, wherein said guide rods are supported at said arms and extend parallel to said arms.

7. A deformable sealing device according to claim 1, wherein a length of said guide rods is reducible against an elastic force.

8. A deformable sealing device according to claim 7, wherein said elastic force is generated by a pressure spring.

9. A deformable sealing device according to claim 8, wherein said guide rods are in the form of a telescopic arrangement and said pressure spring is arranged inside said guide rods.

10. A deformable sealing device according to claim 1, wherein said guide rods are provided with securing means for preventing a pivoting of said guide rods in a downward direction from an initial position thereof and said guide rods are an exclusive support means for supporting said transverse support, said upper transverse portion and said top cover.

11. A deformable sealing device according to claim 1, wherein said guide rods are connected to free ends of said transverse support.

12. A deformable sealing device according to claim 1, wherein two of said guide rods are provided laterally outwardly with respect to said sealing device.

13. A deformable sealing device according to claim 1, wherein said transverse support rests loosely on abutments.

14. A deformable sealing device according to claim 13, wherein said abutments are arms.

15. A deformable sealing device according to claim 14, wherein said transverse support with free ends thereof rests on said arms that are supported at the building wall.

16. A deformable sealing device according to claim wherein said transverse support is provided with recesses at said free ends with which said free ends rest on said arms.

17. A deformable sealing device according to claim 1, wherein said transverse support together with said upper transverse portion and said top cover are supported in an initial position by guide rods extending in an upward direction at an acute angle relative to the building wall, said guide rods having an adjustable length.

18. A deformable sealing device according to claim 17, wherein said guide rods are pivotably fastened to the building wall at a location at a distance below said top cover.

19. A deformable sealing device according to claim 18, wherein said guide rods are pivotably fastened with an upper end thereof to said transverse support.

20. A deformable sealing device according to claim 19, wherein said guide rods are fastened to the building wall via an intermediate piece that is fixedly connected to the building wall.

21. A deformable sealing device according to claim 17, wherein said guide rods comprise essentially a rod and a pipe, said rod being inserted into said pipe and being provided with an abutment at a free end thereof, said abutment.

22. A deformable sealing device according to claim 17, wherein said guide rods are connected to free ends of said transverse support.

23. A deformable sealing device according to claim 17, wherein said guide rods are positioned laterally outwardly with respect to said sealing device.

* * * * *

UNITED STATES PATENT AND TRADEMARK OFFICE
CERTIFICATE OF CORRECTION

PATENT NO. : 5,195,285
DATED : March 23, 1993
INVENTOR(S) : Alten

It is certified that error appears in the above-indentified patent and that said Letters Patent is hereby corrected as shown below:

On the title page, Item [22] should read: —Sep. 25, 1991—.
Item [30] should read: Foreign Application Priority Data —Sep, 25, 1990 [DE] Fed. Rep. of Germany .....4030253— and; —Apr. 09, 1991 [DE] Fed. Rep. of Germany .....4111367—.

Signed and Sealed this

Twenty-first Day of June, 1994

Attest:

BRUCE LEHMAN

*Attesting Officer*           *Commissioner of Patents and Trademarks*